United States Patent [19]

Allen, Jr.

[11] Patent Number: 5,189,939
[45] Date of Patent: Mar. 2, 1993

[54] APPARATUS FOR CUTTING BLOCKS OF ICE

[75] Inventor: Russel G. Allen, Jr., San Antonio, Tex.

[73] Assignee: Carbonic Reserves, Inc., San Antonio, Tex.

[21] Appl. No.: 814,979

[22] Filed: Dec. 23, 1991

[51] Int. Cl.⁵ .............................................. B26D 3/06
[52] U.S. Cl. ........................................ 83/878; 83/885; 83/149; 83/165; 83/408; 83/425.1; 83/425.3; 83/478; 83/915.3
[58] Field of Search .................... 83/51, 149, 156, 165, 83/408, 425, 425.1, 420, 436, 449, 471.1, 478, 835, 885, 915.3, 425.2, 425.3, 876, 878; 125/13.01

[56] References Cited

U.S. PATENT DOCUMENTS

| | | |
|---|---|---|
| 766,111 | 7/1904 | Mowery . |
| 832,582 | 10/1906 | Sloan . |
| 1,274,079 | 7/1918 | Reuschline ..................... 83/915.3 X |
| 1,541,603 | 6/1925 | Turner . |
| 1,547,620 | 7/1925 | Shope et al. . |
| 1,707,801 | 4/1929 | Fain et al. ......................... 83/425 X |
| 1,723,843 | 8/1929 | Chapin ................................. 83/835 |
| 1,796,151 | 3/1931 | Happel . |
| 1,888,938 | 11/1932 | Shellman ..................... 83/915.3 X |
| 2,024,517 | 12/1935 | Fowler . |
| 2,153,438 | 4/1939 | Sheldon et al. . |
| 2,242,932 | 5/1941 | Turner et al. . |
| 3,261,383 | 7/1966 | Coblentz . |
| 3,491,807 | 1/1970 | Underwood ..................... 83/425 X |
| 3,491,816 | 1/1970 | Harrison . |
| 3,927,592 | 12/1975 | Nienstedt ......................... 83/404.2 |
| 3,981,216 | 9/1976 | Lemmon ........................... 83/835 X |
| 4,727,787 | 3/1988 | Schlosser ......................... 83/156 X |
| 4,881,377 | 11/1989 | Nienstedt ..................... 83/425.1 X |

Primary Examiner—Eugenia Jones
Attorney, Agent, or Firm—Dunlap Codding Lee

[57] ABSTRACT

An apparatus for cutting blocks of ice has a frame which defines a feed chute slightly larger than the uncut block of ice. Four saws are mounted to the frame in pairs. Each pair of saws includes two counter rotating, radial saw blades aligned opposite each other and extending toward one another into the feed chute of the frame. To facilitate the transfer of the uncut block of ice into the feed chute, a feed assembly is attached to the frame. A discharge assembly is secured to the frame to assist in removing the cut ice from the frame. The frame is mounted on a stand in an inclined position with the feed assembly higher than the discharge assembly to allow gravity feed of the ice. A gang of blades may be used with the saws in order to cut the block of ice into smaller sized blocks with one pass through the feed chute. The saw blades have carbide-tipped saw teeth to extend the amount of use between resharpening or replacement. Cutouts are formed in the saw blades to compensate for extreme temperature changes by allowing the saw blades to expand and contract without warping.

26 Claims, 5 Drawing Sheets

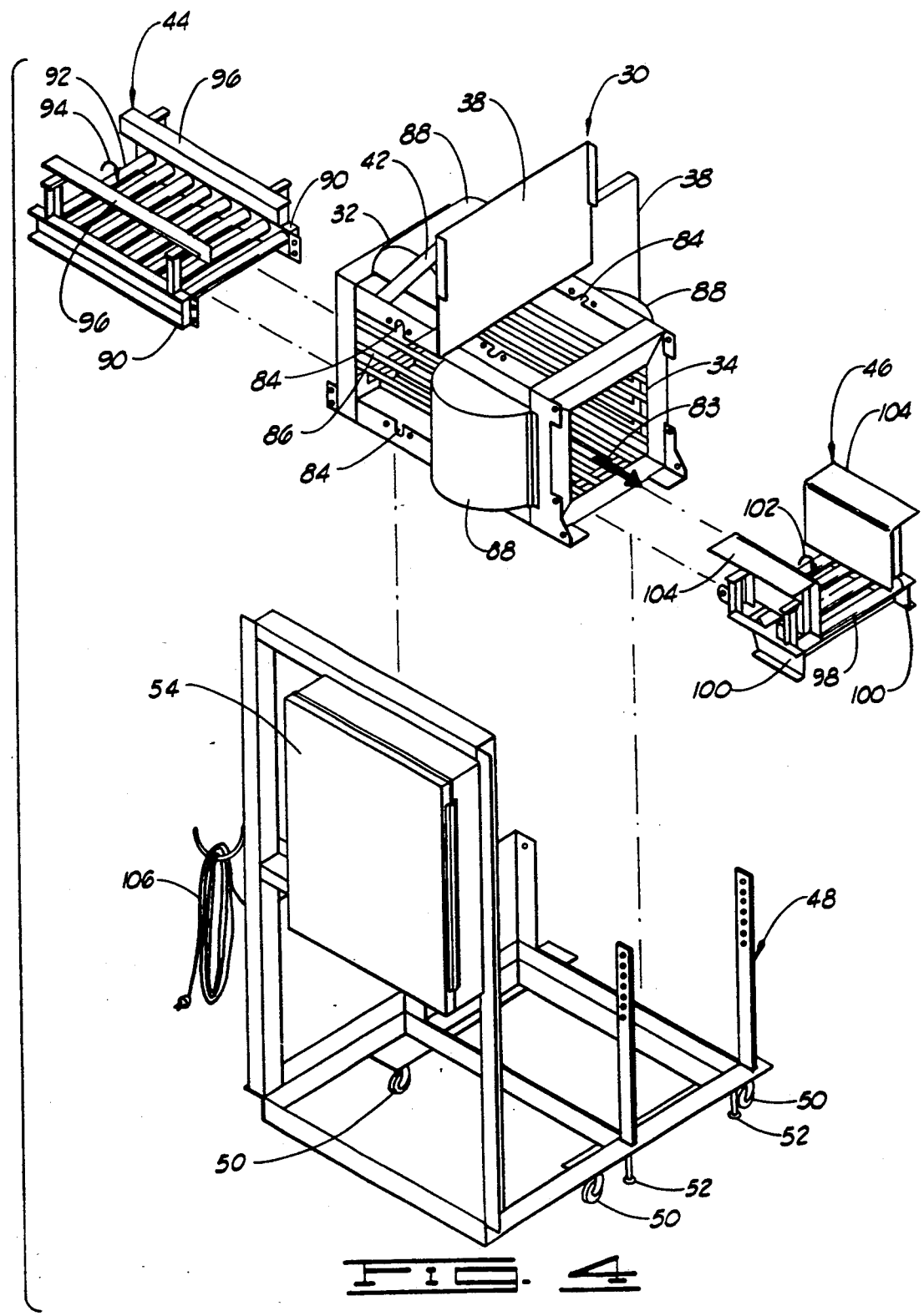

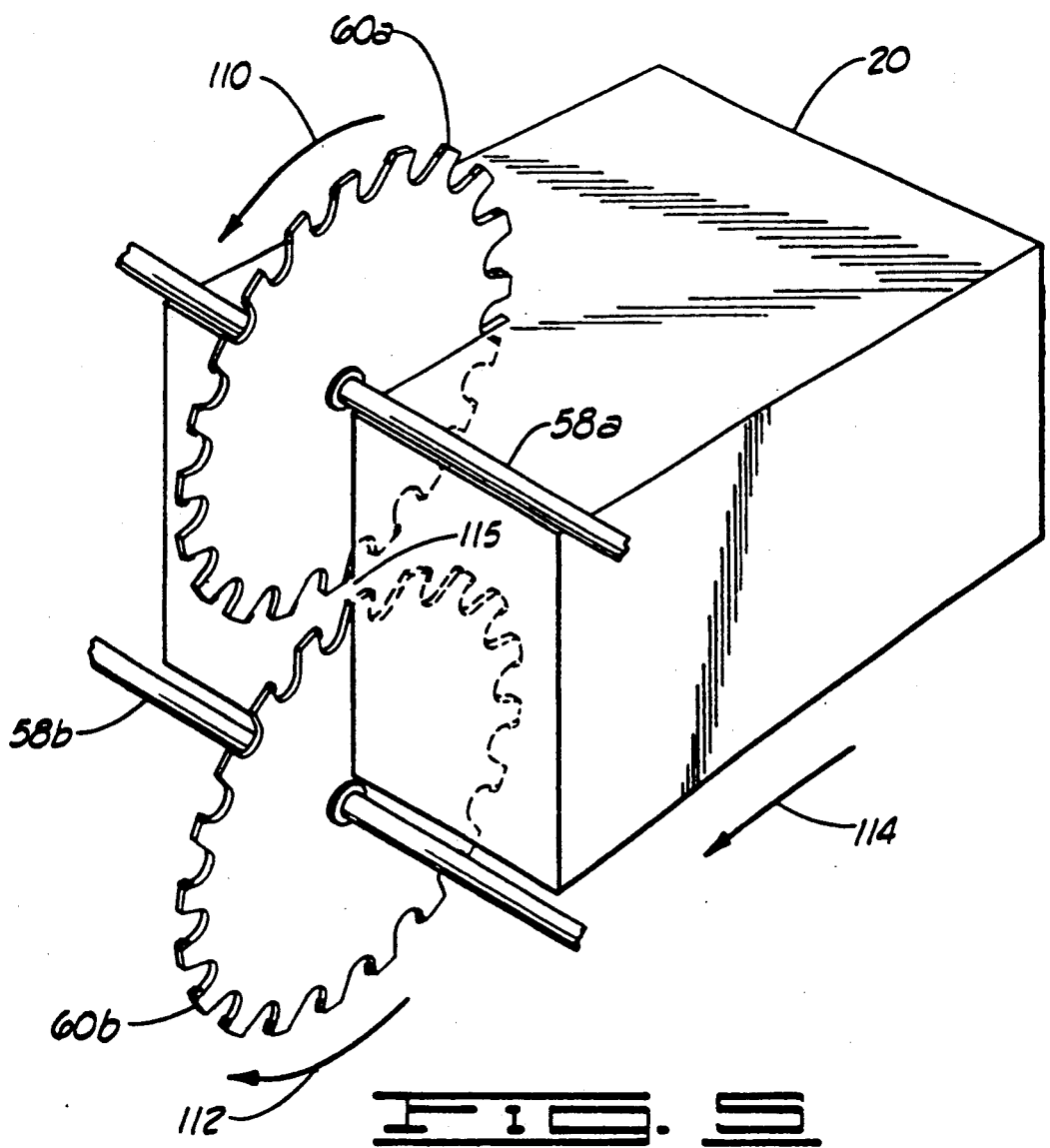
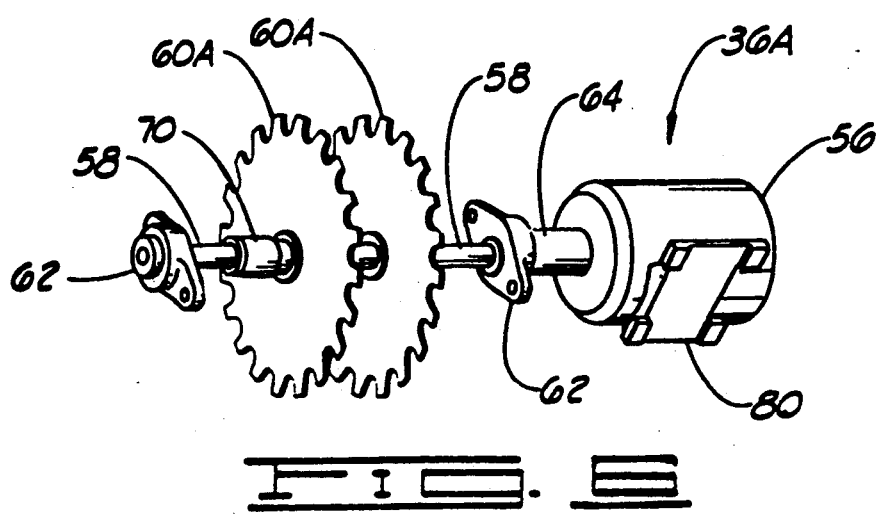

APPARATUS FOR CUTTING BLOCKS OF ICE

FIELD OF THE INVENTION

The present invention relates to an apparatus for cutting blocks of ice and particularly to an apparatus for cutting blocks of dry ice.

SUMMARY OF THE INVENTION

Blocks of dry ice are normally produced in the United States in sizes of 20"×20"×12" and weights of up to 240 pounds. Because this bulky size is difficult to handle, these blocks are often reduced to 10"×10"×12" blocks weighing about 60 pounds. Large band saws are often used to cut these blocks.

Smaller blocks of dry ice, however, are frequently more suitable to customers' needs. For example, 2"×10"×12", 1"×10"×12" and 5"×5"×12" sizes are popular. The conventional way to produce these smaller sizes is by making individual cuts of the 60-pound blocks with manually-operated band saws. An apparatus constructed in accordance with the present invention, however, cuts a block of ice more efficiently and economically than conventional band saws.

In the present invention, a frame defines a straight feed chute through which a block of dry ice is passed to cut the block of dry ice into a predetermined number and size of smaller blocks of dry ice. The frame supports two pairs of saws having at least one radial saw blade. The blades of each pair of saws extend into the frame toward one another from opposing sides of the frame. Each pair of saw blades are perpendicular to the other pair of saw blades to produce rectangular blocks of ice.

One object of the present invention is to provide an apparatus which rapidly cuts dry ice and can be configured to cut the ice in a variety of sizes.

A second object of the present invention is to cut blocks of ice with less labor and with smaller cutting losses than can accomplished with manually operated band saws.

A third object of the present invention is to provide an apparatus with blades which can be maintained for extended periods without resharpening and which can be easily replaced when necessary.

Other objects, features and advantages of the present invention will become apparent from the following detailed description when read in conjunction with the accompanying drawings and appended claims.

BRIEF DESCRIPTION OF THE DRAWINGS

FIG. 4 is an exploded perspective view of the frame, feed assembly, discharge assembly and stand of the apparatus of FIG. 1.

FIG. 5 is a diagrammatical view of a block of ice and one of the pairs of saw blades of the apparatus of FIG. 1.

FIG. 6 is a perspective view of another form of a saw constructed in accordance with the present invention.

DETAILED DESCRIPTION OF THE PREFERRED EMBODIMENTS

Figure 1:
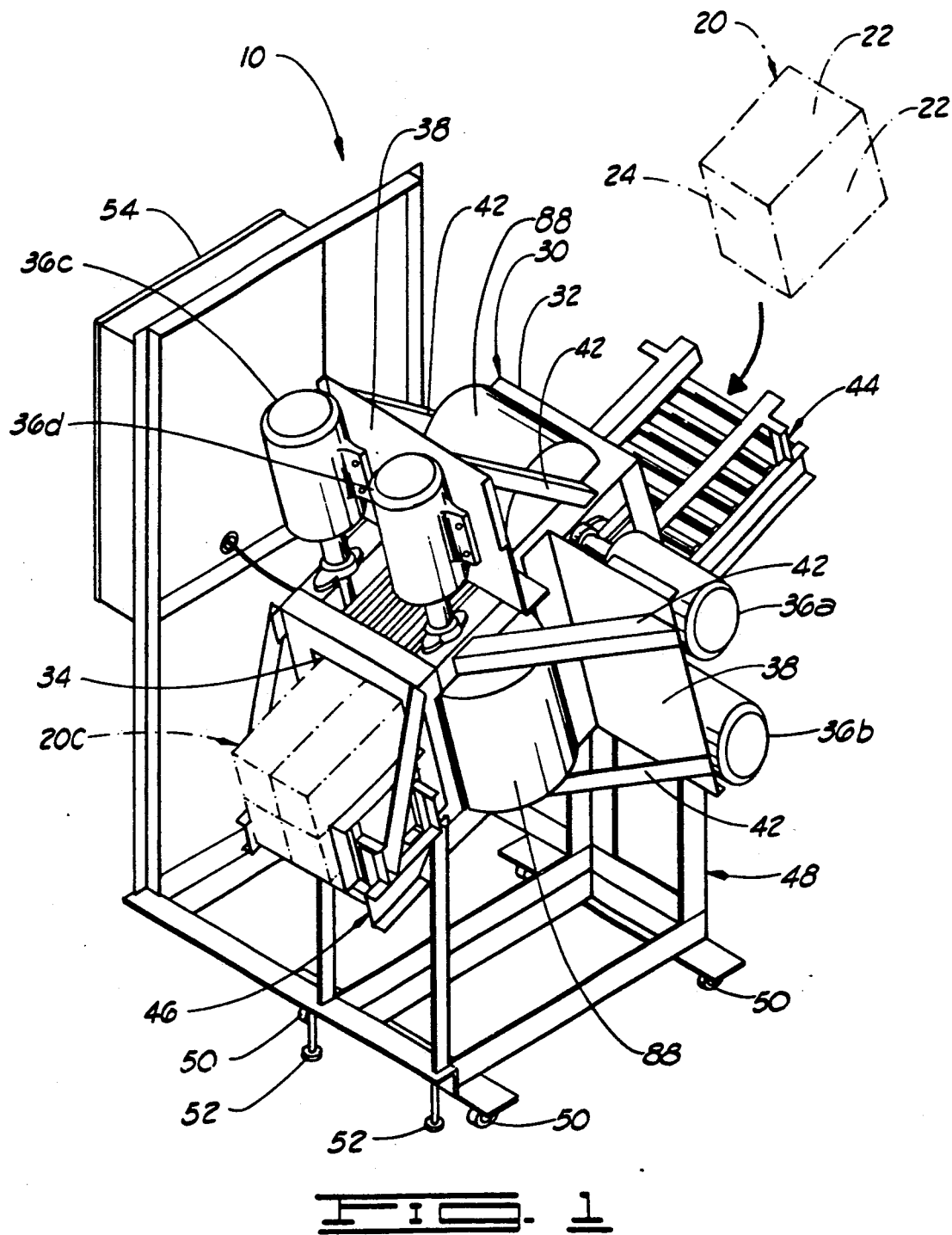
FIG. 1 is a perspective view of an apparatus constructed in accordance with the present invention.

Referring to the drawings in detail and to FIG. in particular, reference character 10 generally designates an ice-cutting apparatus constructed in accordance with the present invention. Reference numeral 20 indicates an uncut block of dry ice with typical dimensions of 10"×10"×12". The block of ice 20 has lateral surfaces 22 which are 10"×12" and end surfaces 24 which are 10"×10". Reference character 20C designates a cut block of ice. As shown in FIG. 1, the block of ice 20 is cut into four 5"×5"×12" blocks of ice.

As illustrated by FIG. 1, the ice-cutting apparatus 10 includes a frame 30 with an open input end 32 communicating with an open output end 34. The frame 30 is sized and shaped to define a straight feed chute for feeding the block of ice 20 through the frame 30 from the input end 32 of the frame 30 to the output end 34 of the frame 30. Preferably the feed chute is slightly larger than the block of ice 20 to be cut.

Four saws 36 are mounted to the frame 30. Two saws 36a and 36b are positioned toward the input end 32 of the frame 30 and two saws 36c and 36d are positioned toward the output end 34 of the frame 30. Two mounting plates 38 secured by a pair of supports 42 are attached to the frame 30 to provide a mounting surface for each pair of saws 36a–36b and 36c–36d.

A feed assembly 44 is attached to the input end 32 of the frame 30 to guide the block of ice 20 into the input end 32 of the frame 30. A discharge assembly 46 is connected to the output end 34 of the frame 30 to receive the cut block of ice 20C.

The frame 30, feed assembly 44 and discharge assembly 46 are preferably attached to a stand 48. The stand 48 is mounted on a set of wheels 50 to facilitate movement of the apparatus 10 from one location to another. The stand 48 also includes a pair of stops 52 to prevent the apparatus 10 from moving while in operation. As shown in FIG. 1, the frame 30, feed assembly 44 and discharge assembly 46 are mounted on the stand 48 in an inclined position with the input end 32 higher than the output end 34. The inclined position allows the block of ice to be fed into the frame 30 with the assistance of gravity. Also attached to the stand 48 is a control panel 54 containing circuit devices for providing electrical power to the saws 36.

Figure 2:
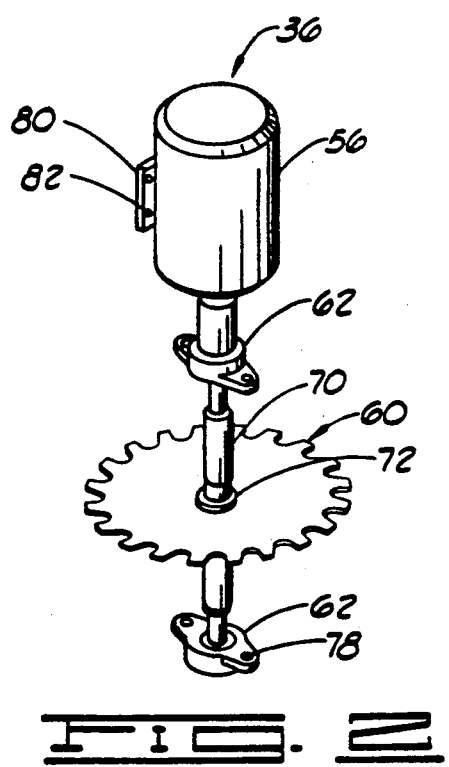
FIG. 2 is a perspective view of one of the saws of the apparatus of FIG. 1.
Figure 3:
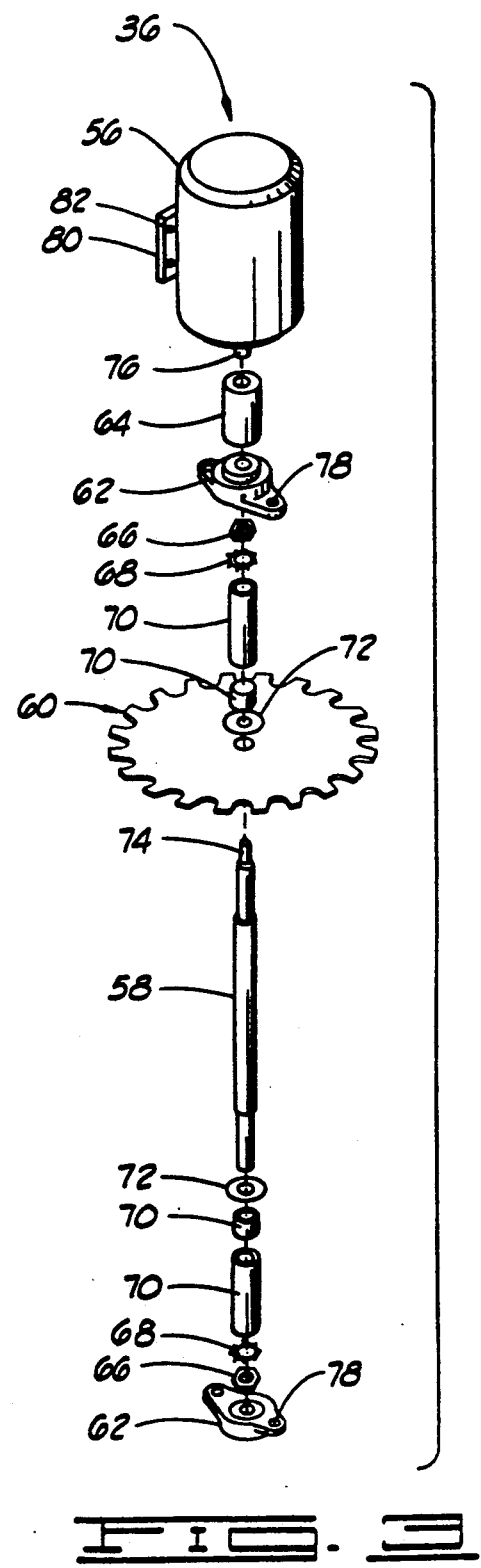
FIG. 3 is an exploded view of FIG. 2.

FIGS. 2 and 3 illustrate one of the saws 36 in detail. As shown in FIG. 2, each saw 36 includes a motor 56, a shaft 58, a radial blade 60 affixed to the shaft 58, and a pair of bearing assemblies 62. The bearings 62 are fixed to the frame 30 and the shaft 58 is located between each pair of bearings 62 with the shaft end 74 extending through one of the bearings 62 to connect to a coupling 64 between the motor 56 and the shaft 58. The coupling connection between the motor 56 and the shaft 58 is keyed and set-screwed. A lock nut 66, lock washer 68, two spacers 70 and a compression plate 72 position the blade 60 at the desired location on the shaft 58. Spacers 70 having various lengths may be used to change the position of the blade 60 on the shaft 58. The blade 60 is keyed to the shaft to prevent rotation of the blade about the shaft 58. Each bearing assembly 62 has a plurality of mounting holes 78 for attachment of the bearing assembly 62 to the frame 30. The motor 56 has a mounting plate 80 with mounting holes 82 for attachment of the motor 56 to the frame 30.

Each motor 56 is preferably an electric, five horsepower motor, although hydraulic or pneumatic power sources could be utilized if available. For simplicity of operation, it is preferred that the shafts 58 are directly driven by the motors 56, but the shafts 58 could be belt-driven to allow for speed adjustments. The blades 60 are driven at approximately 3600 revolutions per minute.

The blades 60 of the saws 36 are preferably high-tensile steel with carbon-tipped blades. The hardness and durability of certain grades of carbide allows such blades to be used at high surface cutting speeds without resharpening for extended periods of time. The surface cutting speed is calculated by multiplying the circumference of the blade in feet times the revolutions per minute of the blade. A 14-inch diameter blade at 3600 revolutions per minute would have a surface cutting speed of 13,195 surface feet per minute. High surface cutting speeds, such as speeds above 10,000 surface feet per minute, enable the blades 60 to cut an ice block in rapid fashion. The 14-inch diameter carbon-tipped blade at 3600 revolutions per minute would typically cut a 10"×10"×12" block of ice in just a few seconds.

Referring now to FIG. 4, the frame 30, feed assembly 44, discharge assembly 46 and stand 48 are described in detail. The open input end 32, the open output end 34 and the four sides of the frame 30 define a straight feed chute, indicated by the arrow 83, for the block of ice 20 through the frame 30. The shafts 58 of the saws 36 pass through slots 84 of the frame 30 and the bearing assemblies 62 mount to the outside of the frame 30 over the slots 84. Mounting the bearing assemblies 62 on the outside of the frame 30 allows easy removal of the bearing assemblies 62 and shaft 58 for replacement of saw blades 60. The mounting surface 38 for each pair of saws 36 is attached to the frame 30 and braced by support members 42. With the motors 56 fastened to the mounting surfaces 38 and the bearing assemblies 62 attached to the frame 30, the saws are securely mounted to the frame 30.

Each side of the frame 30 comprises a plurality of side members extending from the input end 32 of the frame 30 to the output end 34 of the frame 30 and separated from each other by spaces. One of the side members, designated by reference numeral 86, is generally representative of the side members. The side members 86 keep the block of ice straight as the block of ice moves through the frame 30 and each space between the side members 86 is available to receive one of the saw blades 60. With the shaft 58 of each saw 36 positioned in one of the slotted areas 84 of the frame 30, a portion of the respective saw blade 60 extends through one of the spaces into the feed chute of the frame 30. Several spaces are defined by the side members 86 in each side of the frame 30 so that various numbers and arrangements of saw blades 60 may be used. A portion of each saw blade 60 also extends outside the frame 30. To protect the operator from the blades 60 and rotating parts outside the frame 30, a blade guard 88 is attached to the frame 30 to enclose each saw blade 60. The blade guards 88 also provide a containment for the "ice-dust" produced by the blades 60 in cutting the block of ice 20.

Continuing to refer to FIG. 4, the feed assembly 44 is attached to the input end 32 of the frame 30 and comprises a plurality of rollers mounted between two support members 90. One of the rollers is designated by reference number 92 and is generally representative of the feed assembly rollers. The rollers 92 are adapted to rotate as indicated by direction arrow 94 to facilitate the feeding of the block of ice 20 into the feed chute 83 of the frame 30. A feed guide member 96 is attached to each feed support member 90 to maintain the block of ice 20 in proper alignment as the block of ice 20 is fed into the feed chute 83 of the frame 30.

The discharge assembly 46 is similar to the feed assembly 44 in construction. The discharge assembly 46 has a plurality of rollers 98 between two discharge support members 100. The discharge rollers 98 rotate as indicated by direction arrow 102 to facilitate the removal of the cut block of ice 20C from the frame 30. A pair of discharge guide members 104 maintain the block of ice 20C in proper alignment on the discharge assembly rollers 98.

As pictured in FIG. 4, the frame 30, feed assembly 44 and discharge assembly 46 are mounted on the stand 48. Also mounted to the stand 48 is the control panel 54 which is connected to an electrical power source (not shown) via an electrical power cord 106. The control panel 54 provides electrical connections and control circuitry for the saws 36.

FIG. 5 illustrates the use of pairs of saw blades 60 to cut the block of ice 20. An advantage of the present invention is the use of two smaller blades rather than one larger blade in order to obtain a narrower cut. As the diameter of a radial saw blade is increased, the thickness of the blade must also increase to provide the strength and rigidity required to withstand the additional circumferential and radial forces resulting from the increased size. To use a single blade to cut through a 10-inch depth requires a blade of at least 22 inches in diameter and more probably 24 inches in diameter (allowing for the diameter of the supporting shaft). Assuming that the blades are made of the same material, a 22- or 24-inch diameter blade is more than twice as thick as two narrower opposing blades 14 inches in diameter. The use of two narrower opposing blades, therefore, results in a narrower cut in the ice and less material loss.

As FIG. 5 indicates, the two opposing blades 60a and 60b are adapted to rotate on shafts 58a and 58b respectively in directions counter to one another. The counter rotation of the two blades 60a and 60b is shown by the direction arrows 110 and 12. The direction of the movement of the block of ice 20 is indicated by reference numeral 114. This design prevents "climb cutting," which is the riding up of the blade on the material to be cut. By the use of counter-rotation, each blade 60a pushes the block of ice 20 toward the other blade 60b and vice versa, causing a more efficient cut of the block of ice 20.

The opposing blades 60a and 60b are in near engagement with one another but do not contact one another. A space, indicated by reference number 115, is present between the blades 60a and 60b. Accordingly, a thin strip of uncut ice results from the space 115 between the blades 60a and 60b. The strip of uncut ice is easily broken by applying pressure to the cut block of ice.

FIG. 6 illustrates that a gang of blades rather than a single blade may be attached to the shaft 58 of each saw 36. The saw 36A in FIG. 6 has two radial blades 60A equally spaced on the shaft 58 of the saw 36A. The use of the saw 36A to cut a 10-inch block of ice, therefore, would result in three 3.33-inch blocks of ice.

Figure 7:
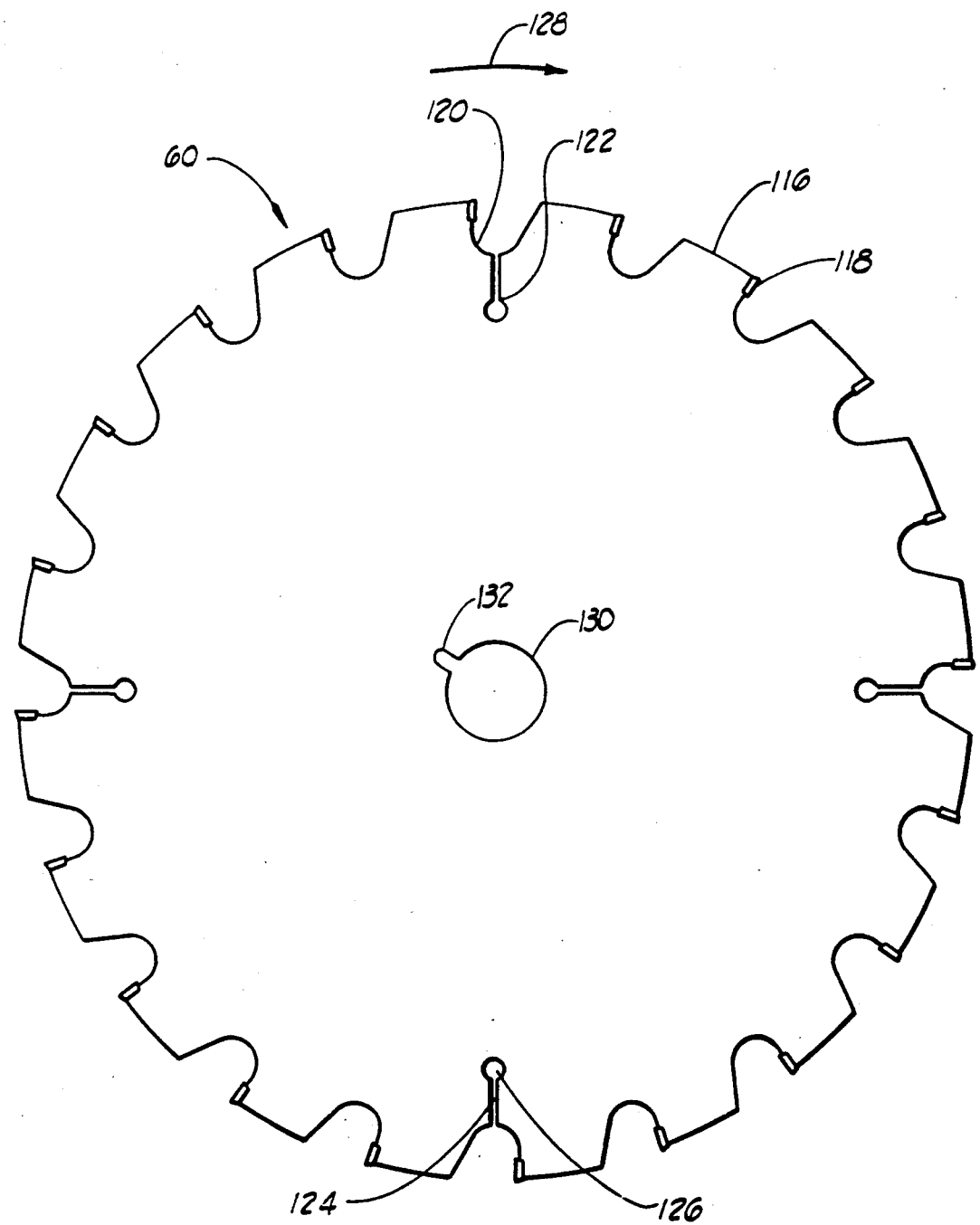
FIG. 7 is a side elevation of one of the saw blades constructed in accordance with the present invention.

Referring now to FIG. 7, the construction of the saw blade 60 is described in detail. Each saw blade 60 is generally circular with a plurality of circumferential saw teeth. One of the saw teeth is designated by reference numeral 116 and is generally representative of the saw teeth of each saw blade 60. Each saw tooth 116 is preferably carbide-tipped to extend the length of time between replacement or resharpening of the saw blades 60. One of the carbide tips is indicated by reference number 118.

Between the saw teeth 116 are gullets. One of the gullets is designated by reference numeral 120 and is generally representive of the gullets. A temperature-compensating cutout 122 extends from the root of four of the gullets 118 to the interior of the saw blade 60. The four cutouts 122 are spaced at ninety-degree intervals around the saw blade 60 and are in the shape of an elongated slot 124 open at the root of the gullet 120 and enlarged into a round hole 126 at the interior of the saw blade 60. The cutouts 122 allow movement of the saw blade 60 along the slots 124 as the saw blade 60 expands and contracts with extreme changes in temperature. This temperature-compensating design reduces compressive forces on the saw blade 60 as the saw blade 60 is subjected the low temperatures of dry ice and helps prevent warping of the saw blades 60.

Continuing to refer to FIG. 7, the direction of the saw blade 60 rotation is indicated by direction arrow 128. A mounting hole 130 in the center of the saw blade 60 is provided to attach the saw blade 60 to the shaft 58. The mounting hole 130 includes a keyway 132 to fit with a key (not shown) on the shaft 58 to ensure that the blade 60 rotates with the rotation of the shaft 58.

Because dry ice is widely used in conjunction with food preparation and storage, all surfaces of the apparatus 10 which come into contact with the ice must be made of materials conforming to state and federal health standards. Accordingly, the inner surfaces of the frame 30, the feed assembly 44, the discharge assembly 46 and the saw blades 60 are be constructed with approved materials.

Changes may be made in the combinations, operations and arrangements of the various parts and elements described herein without departing from the spirit and scope of the invention as defined in the following claims.

I claim:

1. An apparatus for cutting a block of ice, the apparatus comprising:
a frame having four sides, an open input end and an open output end, the input end communicating with the output end to define a straight feed chute for feeding a block of ice through the frame from the input end to the output end of the frame, each side of the frame having a plurality of slots therethrough communicating with the feed chute;
a first saw mounted to the frame and having a first radial saw blade extending through a corresponding one of the slots into the feed chute;
a second saw mounted to the frame and having a second radial saw blade extending through a corresponding one of the slots into the feed chute in coplanar opposition to the first radial saw blade;
a third saw mounted to the frame and having a third radial saw blade extending through a corresponding one of the slots into the feed chute; and
a fourth saw mounted to the frame and having a fourth radial saw blade extending through a corresponding one of the slots into the feed chute in coplanar opposition to the third saw blade;
wherein the first and second radial saw blades are substantially perpendicular to the third and fourth radial saw blades.

2. The apparatus of claim 1 wherein the first radial saw blade and the second radial saw blade rotate in a direction counter to one another.

3. The apparatus of claim 1 wherein the third radial saw blade and the fourth radial saw blade rotate in a direction counter to one another.

4. The apparatus of claim 1 wherein the circumferential periphery of the first radial saw blade is in near engagement with the circumferential periphery of the second radial saw blade.

5. The apparatus of claim 1 wherein the circumferential periphery of the third radial saw blade is in near engagement with the circumferential periphery of the fourth radial saw blade.

6. The apparatus of claim 1 wherein the first, second, third and fourth radial saw blades include a plurality of circumferential saw teeth and a plurality of temperature-compensating cutouts, each cutout extending from the circumferential periphery into the interior of the respective radial saw blade.

7. The apparatus of claim 6 wherein the saw teeth are carbide-tipped.

8. The apparatus of claim 1 wherein the frame is mounted on a stand with the input end of the frame higher than the output end of the frame.

9. The apparatus of claim 1 further comprising:
a plurality of covers attached to the outside of the frame, each cover enclosing a corresponding one of the first radial saw blade, the second radial saw blade, the third radial saw blade and the fourth radial saw blade.

10. The apparatus of claim 1 wherein the first and second radial saw blades are located toward the input end of the frame and make vertical, nearly intersecting longitudinal cuts in the block of ice and wherein the third and fourth radial saw blades are located toward the output end of the frame and make horizontal, nearly intersecting transverse cuts in the block of ice as the block of ice passes through the feed chute.

11. The apparatus of claim 1 further comprising:
feed assembly means, attached to the frame at the input end of the frame, for guiding the block of ice into the feed chute at the input end.

12. The apparatus of claim 1 further comprising:
discharge assembly means, attached to the frame at the output end of the frame, for receiving the cut block of ice form the feed chute at the output end.

13. An apparatus for cutting a block of ice, the apparatus comprising:
a frame having four sides, an open input end and an open output end, the input end communicating with the output end to define a straight feed chute for feeding a block of ice through the frame from the input end to the output end of the frame, each side having a plurality of slots therethrough communicating with the feed chute;
a first saw mounted to the frame and having a plurality of first radial saw blades, each first radial saw blade extending through a corresponding one of the slots of the frame into the fee chute;
a second saw mounted to the frame and having a plurality of second radial saw blades, each second radial saw blade extending through a corresponding one of the slots into the feed chute in coplanar opposition to one of the first saw blades;

a third saw mounted to the frame and having a plurality of third radial saw blades, each third radial saw blade extending through a corresponding one of the slots of the frame into the feed chute; and a fourth saw mounted to the frame and having a plurality of fourth radial saw blades, each fourth radial saw blade extending through a corresponding one of the slots into the feed chute in coplanar opposition to one of the third saw blades;

wherein the first and second radial saw blades are substantially perpendicular to the third and fourth radial saw blades.

14. The apparatus of claim 13 wherein the first radial saw blades are parallel to one another.

15. The apparatus of claim 13 wherein the third radial saw blades are parallel to one another.

16. The apparatus of claim 13 wherein each first radial saw blade and the corresponding second radial saw blade rotate in a direction counter to one another.

17. The apparatus of claim 13 wherein each third radial saw blade and the corresponding fourth radial saw blade rotate in a direction counter to one another.

18. The apparatus of claim 13 wherein the circumferential periphery of each first radial saw blade is in near engagement with the circumferential periphery of the corresponding second radial saw blade.

19. The apparatus of claim 13 wherein the circumferential periphery of each third radial saw blade is in near engagement with the circumferential periphery of the corresponding fourth radial saw blade.

20. The apparatus of claim 13 wherein the first, second, third and fourth radial saw blades include a plurality of circumferential saw teeth and a plurality of temperature-compensating cutouts, each cutout extending from the circumferential periphery into the interior of the respective radial saw blade.

21. The apparatus of claim 20 wherein the saw teeth are carbide-tipped.

22. The apparatus of claim 13 wherein the frame is mounted on a stand with the input end of the frame higher than the output end of the frame.

23. The apparatus of claim 13 further comprising:

a plurality of covers attached to the outside of the frame, each cover enclosing a corresponding one of the first radial saw blades, the second radial saw blades, the third radial saw blades and the fourth radial saw blades.

24. The apparatus of claim 13 wherein the first and second radial saw blades are located toward the input end and make vertical, nearly intersecting longitudinal cuts in the block of ice and wherein the third and fourth radial saw blades are located toward the output end and make horizontal, nearly intersecting transverse cuts in the block of ice as the block of ice passes through the feed chute.

25. The apparatus of claim 13 further comprising:

feed assembly means, attached to the frame at the input end of the frame, for guiding the block of ice into the feed chute at the input end.

26. The apparatus of claim 13 further comprising:

discharge assembly means, attached to the frame at the output end of the frame, for receiving the cut block of ice from the feed chute at the output end.

* * * * *